E. E. ENGLUND.
FERTILIZER ATTACHMENT FOR PLANTERS.
APPLICATION FILED JAN. 4, 1912.

1,057,533.

Patented Apr. 1, 1913.
3 SHEETS—SHEET 1.

Witnesses
Inventor
Ernst E. Englund.

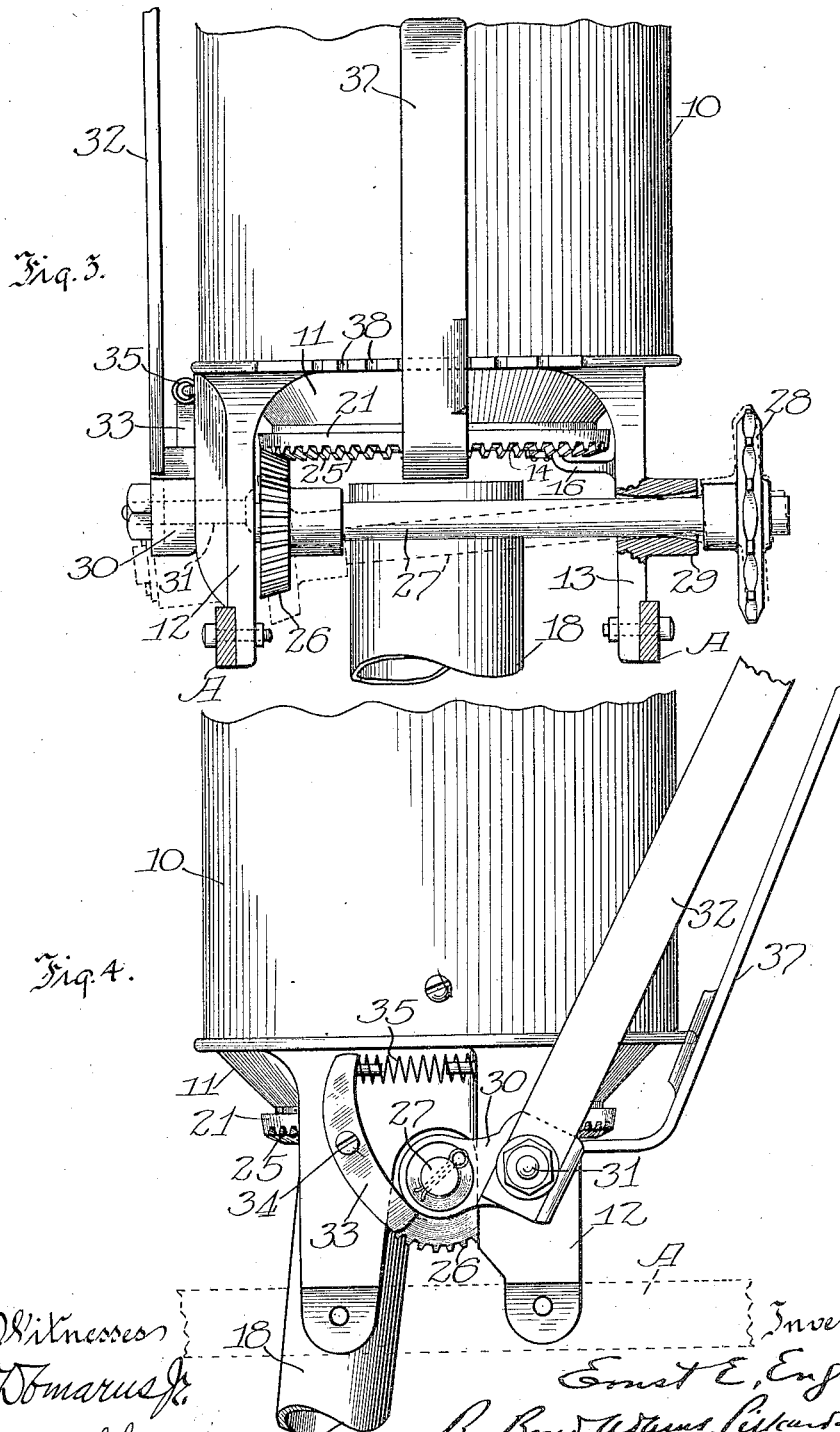

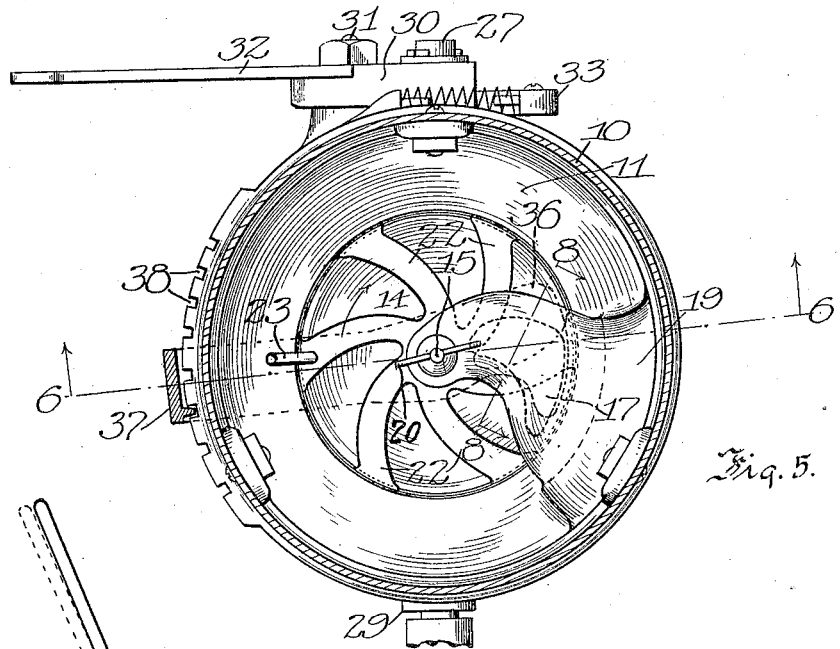
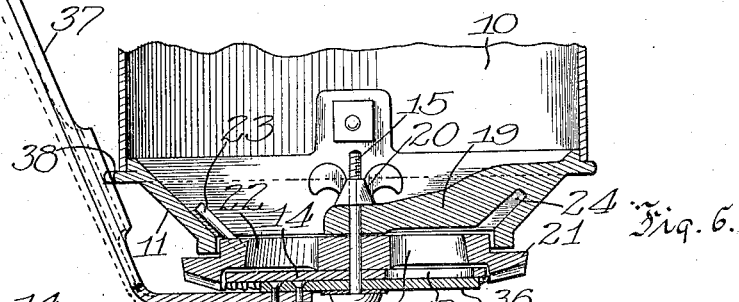
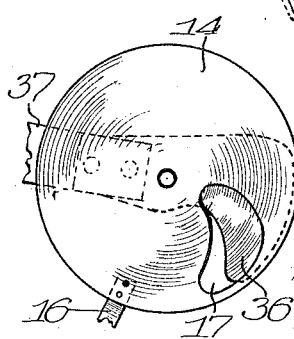
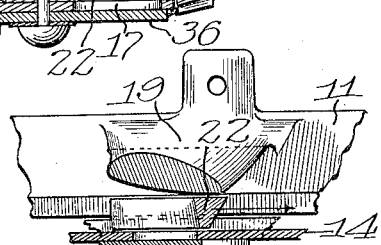

UNITED STATES PATENT OFFICE.

ERNST E. ENGLUND, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

FERTILIZER ATTACHMENT FOR PLANTERS.

1,057,533.  Specification of Letters Patent.  Patented Apr. 1, 1913.

Application filed January 4, 1912. Serial No. 669,405.

*To all whom it may concern:*

Be it known that I, ERNST E. ENGLUND, a citizen of the United States, residing at Moline, in the county of Rock Island, State of Illinois, have invented certain new and useful Improvements in Fertilizer Attachments for Planters, of which the following is a specification, reference being had to the accompanying drawing.

This invention relates to an improved device adapted to be attached to seed planting machines for properly distributing ground or powdered fertilizer and causing it to be deposited in the ground with the seed that is being planted.

The objects of the invention are, briefly stated, to provide a device of this character that can be applied to many of the various makes or types of seeding-machines, and that when applied can be readily thrown into or out of operative relation to the driving means so that fertilizer will be dropped or not as the operator of the planter may desire; to provide an improved rotatable feeding-ring or wheel in the bottom of the fertilizer receptacle that will insure an efficient and ready discharge of the material that is carried around by it to the discharge opening, and to also so construct such discharge opening in the bottom plate of the device that, in connection with the said feeding-ring or wheel, there will be insured a constant flow, as distinguished from an intermittent discharge, of the material.

I also aim to improve in various particulars the construction and operation of devices of this character,—all as hereinafter particularly pointed out.

That which I believe to be new will be set forth in the claims.

Figure 1:
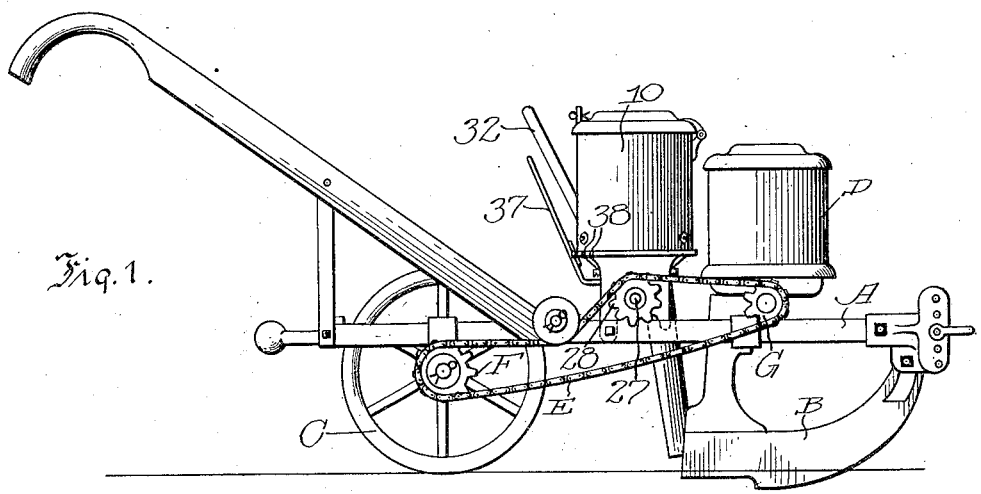
Figure 2:
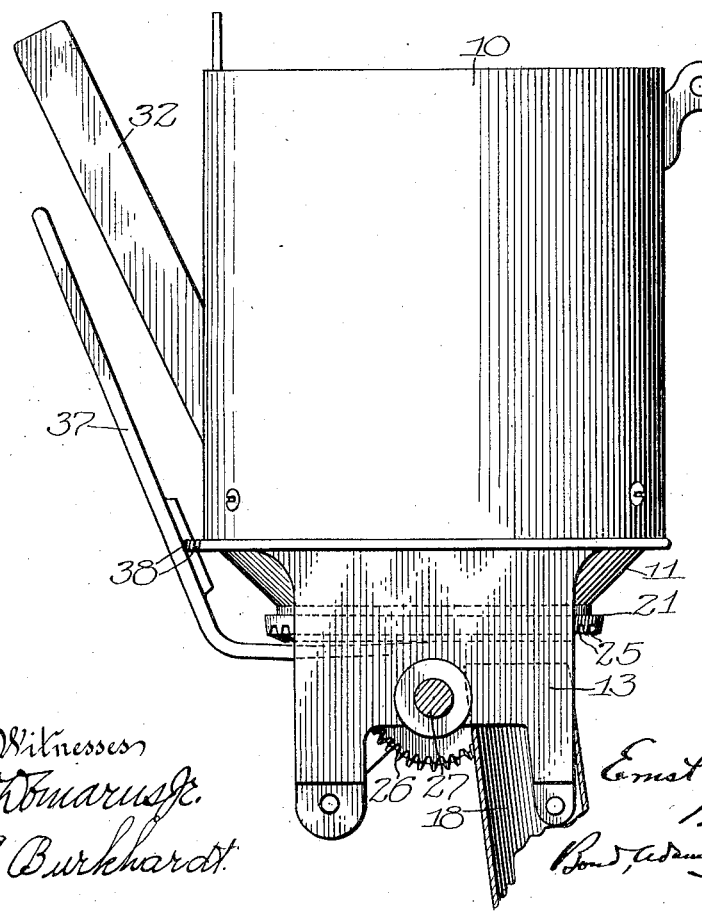

In the drawings,—Figure 1 is a side elevation of a well-known form of one-horse corn-drill having my improvements applied thereto; Fig. 2 is a side elevation of my improved device; Fig. 3 is a rear view of the same, the upper portion of the fertilizer receptacle being broken away; Fig. 4 is a side elevation of the device but looking at the side opposite to that shown in Fig. 2, and with the upper portion of the fertilizer receptacle broken away, as in Fig. 3; Fig. 5 is a horizontal section through the fertilizer receptacle and showing in plan view the feeding-ring located over the bottom plate of said receptacle. By dotted lines in this figure is also indicated the discharge-opening in said bottom plate and the pivoted valve for such opening; Fig. 6 is a cross-section taken at line 6—6 of Fig. 5; Fig. 7 is a detail, being a top view of the bottom plate, and also showing, partly in dotted lines and partly in full lines, the valve employed for regulating the size of the discharge opening in said plate; and Fig. 8 is a detail, being a vertical cross-section taken at line 8—8 of Fig. 5.

Referring to the several figures of the drawings in which corresponding parts are indicated by like reference characters—A indicates the frame of an ordinary well-known type of one-horse corn-drill; B the runners; C the wheel; D the seed-box and E the sprocket chain for driving the seed-plate in the seed-box, said chain running over the usual sprocket-wheels F and G on the wheel-axle and the driving-shaft beneath the seed-box. These parts are to be of any well-known construction and need no further description.

10 indicates the body of the receptacle employed to contain the ground or pulverized fertilizer that is to be deposited simultaneously with the seed being planted. It is preferably cylindrical in form as shown and of sheet metal as usual. It is secured at its lower end by bolts, as shown, or otherwise, to an annular hopper-shaped bottom piece 11, preferably made of cast-iron, from which descend on opposite sides two brackets 12 and 13 adapted to be bolted or otherwise suitably secured to the frame A of the planter shown, or to the frame of such other type of planter as the device may be employed in connection with. These brackets are preferably made integral with the hopper-shaped bottom piece 11.

14 indicates the bottom plate for the fertilizer receptacle mounted centrally upon a bolt 15 and held against rotation in any suitable manner. As shown I provide a short metal strap 16 (see Figs. 3 and 7) riveted to the under face of said bottom plate and projecting therefrom and bearing tightly at its outer end against the inner face of the supporting bracket 13.

17 indicates a curved discharge opening through the bottom plate for the passage of the fertilizer—said opening having located beneath it a spout, as 18, for conducting the fertilizer to the ground.

19 indicates a cap or wide arm carried by and preferably formed with the hopper bottom 11 and projecting inward so that its end will be over the center of the said bottom plate 14. Through this overlying end passes the bolt 15 hereinbefore referred to which is retained in place by a thumb-nut 20 that screws down upon the bolt and against the upper face of the cap or plate.

21 indicates the rim and 22 the spokes of my improved feeding-ring or wheel which is rotatably mounted on the bolt 15, the rim portion as shown lying beneath the edge of the hopper bottom 11 and opposite the edge of the bottom plate (see Fig. 6) and the spoke portions projecting up into the said hopper bottom. The spokes 22 are curved, and in operation, in the construction shown, the convex edge or surface is the leading edge which acts upon the fertilizer to move it forward. The direction of rotation of the feeding wheel is indicated in Fig. 5 by an arrow. It is evident that the spaces between the curved spokes or arms 22 form pockets that will receive the ground fertilizer and that the contents of these pockets will be discharged through the opening 17 in the bottom plate 14 as such pockets are successively brought over such opening. To aid in securing a complete discharge of the contents of each pocket as it passes over the discharge opening and obviate any tendency of the material to clog or stick in the pockets I bevel or incline the side faces of the curved spokes 22 thereby making said pockets that are formed by these spokes wider at the bottom than at the top. Again, to make a more uniform and even feeding of the fertilizer from the receptacle to the spout 18 I curve the discharge opening 17 in one direction and the spokes 22 in the opposite direction, as is best illustrated in Fig. 5. By such construction it will be seen that before the outer end of one curved spoke has passed over the outer end of the oppositely-curved discharge opening the inner end of the next succeeding curved spoke has commenced to pass over the inner end of such discharge opening, thus insuring a much more regular and even discharge than if the said pockets and discharge opening were shaped and arranged alike.

Still another feature of my construction contributes to the successful feeding in proper quantities of the fertilizer to the discharge opening and that is the construction of the cap or arm 19 and its relation to the discharge opening. This cap or arm is arranged over the discharge opening 17 in the bottom plate 14, and, as best shown in the cross-sectional view in Fig. 8 the under face of the cap or arm is beveled or inclined so that at that side where the spokes enter beneath the cap or arm there is a space of considerable width which gradually decreases until at the opposite side or edge, or that at which the spokes pass from under the cap or arm, the space is very narrow. The result of so shaping or constructing the cap or arm is that it has a wedging or constantly increasing pressure upon the material in each pocket that passes beneath it, which of course will tend to eject it from the pocket and out through the discharge opening. By reason of the widening of the pockets at their lower ends due to the inclination given to the edge faces of the spokes and the constantly increasing pressure imparted to the material by the inclined or wedge-shaped under face of the cap or arm the clean and ready discharge of material from each pocket is insured at all times.

23 indicates a pin secured to and carried by one of the spokes 22 and projecting upward therefrom. It is provided for the purpose of stirring up the mass of material in the receptacle so as to enable such material to be in proper condition to enter the pockets formed by the curved spokes. The cap or arm is provided in its under face with a suitable groove 24 to permit the passage of the said pin. The under face of the ring or wheel-rim 21 is provided with cogs or teeth 25 adapted to mesh with a bevel gear 26 mounted on a shaft 27 journaled at one end in a bearing in the brackets 13 and at the other end in a shiftable bearing pivotally connected with the opposite bracket 12 as hereinafter described. On one end of the shaft is secured a sprocket-wheel 28 over which, in the construction shown, runs the sprocket-chain E hereinbefore referred to, whereby the fertilizer-distributing mechanism will be operated simultaneously with the seed-delivering mechanism in the seed-box D.

It is at times desired to operate the seed-dropping mechanism alone and I therefore provide means whereby the fertilizer-distributing mechanism can be very quickly placed out of operation, which means I will now proceed to describe—29 indicates the shaft-bearing in the supporting-bracket 13, which, as shown by the sectional view of it in Fig. 3, is of a character to permit the shaft 27 to be rocked up and down in it, so that if desired the bevel gear 26 can be disengaged from the cogs or teeth 25 of the wheel-rim or ring 21—the disengaged position being indicated in that figure by dotted lines. The bracket 12, as best shown in Fig. 4, is provided with a wide slot through which the opposite end of the shaft 27 projects, such end being journaled in the free end of a short arm 30 that at 31 is pivoted to the bracket 12. To the pivoted end of this short arm 30 is fixedly secured a lever 32 which rises up at the side of the receptacle 10. By rocking the short arm 30 on its pivot 31 by means of the lever 32 it is evident that the shaft can be raised to bring the bevel-gear 26 into mesh with the annular gear 25, as shown in full lines in Fig. 3, or that the shaft can be lowered sufficiently to carry such bevel gear out of mesh with the said annular gear, as indicated by the dotted lines in said figure. To hold the shaft in its raised or operative position I provide a pawl 33 pivoted at 34 to the face of the bracket 12, the lower end of which pawl engages under the shaft, as shown, to support it. The pawl is held in proper shaft-supporting position by a suitable spring. Such a spring is shown at 35. When the lever is forced forward to cause a disengagement of the bevel gear 26 from the other gear, 25, the pawl 33 will be turned on its pivot, 34, against the action of the spring 35 and as the center of the shaft passes the free end of the pawl the spring will again force such free end of the pawl backward and hold it in contact with the lowered shaft so that the shaft will not move or rattle as the planter moves along the ground. A reverse movement of the lever 32 will instantly raise the shaft and bring the gear 26 into driving relation with the annular ring 21.

36 indicates a valve in the form of a flat plate which lies beneath the bottom plate 14 and is pivotally mounted on the bolt 15. It is adapted to regulate the size of the discharge opening 17 and it is manipulated through an attached handle 37. This handle is adapted to engage any one of a series of notches 38 formed in a rearwardly-projecting portion of the upper edge of the hopper-shaped bottom 11 whereby the valve will be securely held in any position to which it may adjusted.

I have illustrated my improved fertilizer distributing device in connection with a one-horse corn-drill in which but a single supporting wheel is employed and also but a single seed-box and a single fertilizer receptacle. It is to be understood, however, that the invention may, with equal advantage, be employed in connection with the ordinary makes of check-row planters and in such cases there would be employed two of the fertilizer receptacles—one at each side of the machine. Also, there may be employed in connection with the spouts that receive the fertilizer any of the ordinary valve devices for regulating the dropping of the material from the spout to the ground, but as such devices are well-known and form no part of my present invention I have not deemed it necessary to here illustrate or specifically describe any such constructions.

What I claim as my invention, and desire to secure by Letters Patent, is—

1. The combination with a receptacle adapted to contain fertilizer material and having a discharge opening in its bottom, of a rotatable feeding device mounted over the bottom of the receptacle, said device having openings therethrough that are larger at one end than at the other and are wider at the bottom than at the top.

2. The combination with a receptacle adapted to contain fertilizer material and having a discharge opening in its bottom, of a rotatable feeding-wheel mounted over the bottom of the receptacle, said wheel having spokes wider at the top than at the bottom and the openings between the spokes being larger at one end than at the other.

3. The combination with a receptacle adapted to contain fertilizer material and having a discharge opening in its bottom, of a rotatable feeding wheel mounted over the bottom of the receptacle, said wheel having curved spokes wider at the top than at the bottom.

4. The combination with a receptacle adapted to contain fertilizer material and having a discharge opening in its bottom, of a rotatable feeding-wheel mounted over the bottom of the receptacle, said wheel having spokes each having a beveled edge the openings between the spokes being larger at one end than at the other and wider at the bottom than at the top.

5. The combination with a receptacle adapted to contain fertilizer material and having a discharge opening in its bottom, of a rotatable feeding-device mounted over the bottom of the receptacle and containing pockets open at the top and bottom, said pockets being larger at the bottom than at the top and wider at the outer ends than at the inner ends.

6. The combination with a receptacle adapted to contain fertilizer material and having a discharge opening in its bottom, of a rotatable feeding-device mounted over the bottom of the receptacle and containing pockets open at the top and bottom, each of said pockets having one of its side walls curved between the inner and outer ends of the pocket and also beveled or inclined, whereby the pocket is wider at one end than at the other and larger at the bottom than at the top.

7. The combination with a receptacle adapted to contain fertilizer material and having a curved discharge opening in its bottom, of a rotatable feeding-wheel mounted over the bottom of the receptacle, said wheel having spokes curved in a direction opposite to the curve of said discharge opening.

8. The combination with a receptacle adapted to contain fertilizer material and having a curved discharge opening in its bottom, of a rotatable feeding-wheel mounted over the bottom of the receptacle, said wheel having spokes wider at the top than at the bottom and curved in a direction opposite to the curve of said discharge opening.

9. The combination with a receptacle adapted to contain fertilizer material and having a discharge opening in its bottom, of a feeding-wheel rotatably mounted over the bottom of the receptacle, and a rigid cap or arm extending from the side of the receptacle over the feeding wheel, the lower face of said cap or arm being inclined.

10. The combination with a receptacle adapted to contain fertilizer material and having a discharge opening in its bottom, of a feeding-wheel rotatably mounted over the bottom of the receptacle, and a rigid cap or arm extending from the side of the receptacle over the feeding wheel, that edge of the cap or arm which the spokes first pass beneath being higher than the other edge.

11. The combination with a receptacle adapted to contain fertilizer material and having a curved discharge opening in its bottom, of a feeding-device rotatably mounted over the bottom of the receptacle, said feeding-device having pockets larger at the bottom than at the top, and having the division walls between the pockets curved in a direction opposite to the curve of said discharge opening, and a cap or arm extending from the side of the receptacle over the feeding-device and located over the discharge opening, the lower face of said cap or arm being inclined from one edge toward the other edge.

12. The combination with a receptacle adapted to contain fertilizer material and having a discharge opening in its bottom, of a feeding-wheel rotatably mounted over the bottom of the receptacle, a pin carried by said feeding-wheel for agitating the material in the receptacle, and a cap or arm extending from the side of the receptacle over the feeding-wheel and provided with a slot for the passage of said pin.

ERNST E. ENGLUND.

Witnesses:
 CHAS. M. McCUTCHEON,
 J. C. TUNNICLIFF.

---

Copies of this patent may be obtained for five cents each, by addressing the "Commissioner of Patents, Washington, D. C."